3,756,988
PREPARATION OF POLYESTERS FROM ACYLOXYETHYL TEREPHTHALATES
John Kollar, Wyckoff, and Joseph Pugach, Ho-Ho-Kus, N.J., assignors to Halcon International, Inc.
No Drawing. Filed Dec. 16, 1971, Ser. No. 208,936
Int. Cl. C08g 17/003, 17/01
U.S. Cl. 260—75 M                  10 Claims

ABSTRACT OF THE DISCLOSURE

Fiber and film-forming polyethylene terephthalate resins are prepared by a process which comprises polymerizing bis-(beta-acyloxyethyl) terephthalate mono-(beta-acyloxyethyl) terephthalate, or mixtures thereof, the acyl groups of which have from 1 to 4 carbon atoms, to form low molecular weight oligomers thereof and to liberate carboxylic acid and lower carboxylate esters of ethylene glycol, adding ethylene glycol to the oligomers thus obtained, and polymerizing the resultant mixtures to form polymers therefrom of increased molecular weight.

---

Fiber or film-forming polyethylene terephthalate resins are important commercial commodities and are produced on a large scale. To date, however, substantially all commercial production of these resins has proceeded from terephthalic acid by one of two routes. One of these routes involves the reaction of terephthalic acid directly with ethylene glycol to form the polymer. The other of these routes comprises the esterification of terephthalic acid with methanol to form dimethyl terephthalate which is then reacted with ethylene glycol to form bis-(beta-hydroxyethyl) terephthalate which is subsequently polymerized.

While these two routes are effective to produce the desired products they both suffer from the same major drawback, which is the necessity for the use of extremely pure terephthalic acid or dimethyl terephthalate in order to provide resin products of acceptable quality. Purification techniques for these materials do, of course, exist but have proven to be extremely expensive, largely as a result of the exceeding poor solubility characteristics of terephthalic acid and the extremely low volatility of its dimethyl ester. These monomers have conventionally been purified by multiple high temperature recrystallizations coupled with distillation under extremely high vacuum. Such purification techniques have been deemed necessary even though they are notoriously expensive because it has heretofore been thought that only extremely pure monomeric components were suitable for the manufacture of polyesters.

It has been proposed to convert terephthalic acid to bis-(beta-acetoxyethyl) terephthalate and then to polymerize this acetoxyethyl diester of terephthalic acid directly to the polyester resin. (See British patent specification No. 760,125.) Despite the superficial attractiveness of this route, however, it has not found commercial acceptance and, indeed, efforts to polymerize bis-(beta-acetoxyethyl) terephthalate directly to a relatively high molecular weight polymer, have been unsuccessful.

It is accordingly an object of this invention to provide an improved process for the production of polyester resins, specifically polyethylene terephthalate resins, which avoids the drawbacks and disadvantages of prior processes.

It has been found that mono-(beta-acyloxyethyl) terephthalates, bis-(beta-acyloxyethyl) terephthalates, and mixtures of mono- and bis-(beta-acyloxyethyl) terephthalates (which, for convenience, will be referred to as "mono-bis mixtures"), can be polymerized to form low molecular weight oligomers and these oligomers, after the addition of an appropriate quantity of ethylene glycol, form a polyester precursor composition of high quality which can be polymerized to form fiber-grade polyesters. These acyloxyethyl terephthalates can be readily prepared, e.g., by reacting terephthalic acid and ethylene glycol diesters of lower carboxylic acids, such as ethylene glycol diacetate and ethylene glycol diformate, e.g. by heating. See co-pending applications Ser. No. 780,274, filed Nov. 29, 1968 and Ser. No. 41,653, filed May 28, 1970, both now abandoned, and Belgian Pat. 742,175. When co-produced carboxylic acid is not removed during the reaction, formation of mono-bis mixtures is favored, whereas removal of carboxylic acid leads to substantially exclusive formation of bis-(beta-acyloxyethyl) terephthalates. The terephthalic acid purity required to make the acyloxyethyl derivative is not high and the impurities normally present in terephthalic acid do not interfere with the reactions involved, whereas these impurities can readily be removed from the acyloxyethyl ester once it is formed. Mono-(beta-acyloxyethyl) terephthalates can also be produced by reacting ethylene glycol diesters with p-toluic acid to esterify the carboxyl group in an acidolysis reaction of the type described in the above-noted references, followed by oxidation of the methyl group by oxidation techniques known in the art. However, the invention is in no way limited to, or dependent upon, any particular method of producing the acyloxyethyl terephthalates. Such terephthalates as produced may be admixed with minor amounts of free terephthalic acid.

This invention is founded on the discovery that bis-(beta-acyloxyethyl) terephthalates, mono-(beta-acyloxyethyl) terephthalates, and mono-bis mixtures, including terephthalates admixed with up to 25 mol percent terephthalic acid, can readily be converted to high molecular weight polyester resins suitable for fibers or films. In accordance with this invention, this conversion is accomplished by a series of process steps comprising the oligomerization of the mono- or bis-(beta-acyloxyethyl) terephthalate, or the mono-bis mixture, to produce a precursor composition, followed by the further polymerization of the precursor composition in the presence of added ethylene glycol.

The oligomerzation is carried out by causing a bis-(beta-aceyloxyethyl) terephthalate, a mono-(beta-acyloxyethyl) terephthalate, or a mono-bis mixture, under the influence of heat, and preferably in the presence of a suitable catalyst, to undergo limited polymerization, e.g. to form oligomers or low molecular weight polymers having an average of 4 to 60 polymer units or segmers. The oligomerization reaction is continued until at least 50 mol percent of the monomeric acyloxyethyl terephthalates contained in the feed have been converted to oligomers, preferably at least 75 mol percent.

Superficially, the primary chemical reaction involved in this first step of the process of this invention is the polycondensation of compounds of the following formula:

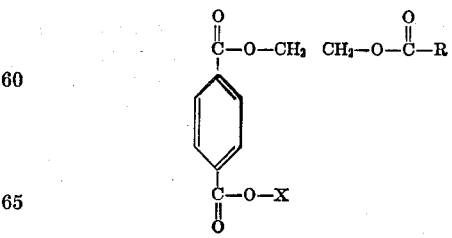

wherein X=H or

and R is an alkyl radical having 1 to 3 carbon atoms, to form oligomers which can be characterized as having the formula:

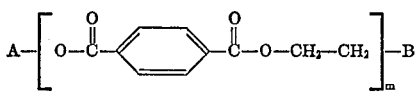

wherein A is H, HO—CH$_2$—CH$_2$, or

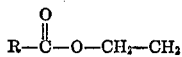

and wherein B is OH,

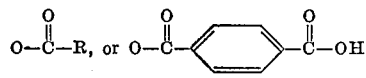

and wherein "m" is a number from 2 to 60, usually 3 to 40. When free terephthalic acid is present, and in terephthalates produced by processes such as described above the terephthalic acid, unless removed, may be present in amounts up to 25 mol percent, generally 5 to 15 mol percent, the terephthalic acid also enters into the polycondensation by inter-reaction with the terephthalates.

As will be apparent from the foregoing formulae, the polymerization or polycondensation is accompanied by the formation of various by-products, primarily compounds of the formula

e.g. acetic acid,

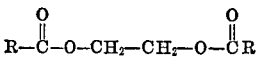

e.g. ethylene glycol diacetate, water and

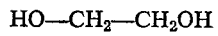

The monoester of ethylene glycol

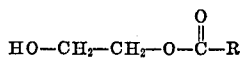

may also be present.

In accordance with this invention, the by-products of the oligomerization are separated from the oligomerized reaction product, preferably concurrently with the oligomerization reaction, or after completion of this reaction, at least to the extent that 50% by weight of the carboxylic acid and carboxylate ester liberated, preferably at least 75%, is removed. Then ethylene glycol is added to the ester product and reacted with it, and the reaction mixture is thereupon polymerized or polycondensed to produce the desired polyethylene terephthalate product. In view of the failure of the prior art dealing with acyloxyethyl terephthalates to obtain satisfactory polymer, it is quite surprising to find that high quality polymers can be obtained from so complex a mixture.

The terephthalate raw material for the process of this invention comprises, as previously mentioned, esters of ethylene glycol consisting essentially of bis-(beta-acyloxyethyl) terephthalate, mono-(beta-acyloxyethyl) terephthalate, or a mono-bis mixture. Processes for the preparation of the acyloxyethyl terephthalates generally result in the concurrent production of a small percentage of oligomers, polymer units or segmers, from which the monomers are preferably separated, as by distillation, e.g. in a wiped film evaporator. Free terephthalic acid in amounts up to about 25 mol percent may, as mentioned, be present.

The diester itself has the structural formula:

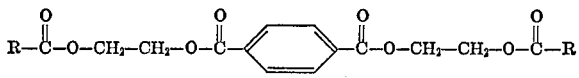

where "R" has the same meaning as that set for above.

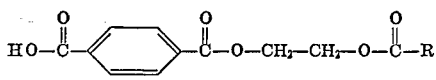

wherein "R" has the same meaning as that set forth above.

Thus, suitable feeds to the process of this invention are bis-(beta-formoxyethyl) terephthalate, bis-(beta-acetoxyethyl) terephthalate, bis-(beta-propionoxyethyl) terephthalate, and bis-(beta-butyroxyethyl) terephthalate, the corresponding mono-(beta-acyloxyethyl) terephthalates, and mixtures of the mono- and bis-esters. Mixtures of these bis-terephthalates or mixtures of these mono-terephthalates can also be employed, as can interesters thereof, such as beta-formoxyethyl-beta-acetoxyethyl terephthalate. Of these esters, the preferred are bis-(beta-acetoxyethyl) terephthalate, mono-(beta-acetoxyethyl) terephthalate, and mixtures of the mono- and bis-(beta-acetoxyethyl) terephthalates, since acetic acid and its derivatives are relatively inexpensive and widely available.

The mono-bis mixtures may range from a mixture of bis-(beta-acyloxyethyl) terephthalate with a trace of mono-(beta-acyloxyethyl) terephthalate to a mixture of the mono-ester with a trace of the bis compound. Ordinarily, however, the bis-(beta-acyloxyethyl) terephthalate is the predominant component of the mono-bis mixture, but mixtures containing up to 70% of the mono-ester are entirely suitable, and good results are also readily obtained with mixtures containing up to 90 or 95% of the mono-ester. Small amounts of numerous coproducts, in sum up to about 40 mol percent of the total feed, generally up to about 5 mol percent, associated with the production of the beta-acyloxyethyl terephthalates can also be present in the feed. The term "coproduct" is used to include by-products of the reaction, unreacted reagents, and like components of the terephthalate-producing reaction. The use of feeds containing such amounts of coproducts is also contemplated within the scope of this invention. Such coproducts include ethylene glycol, ethylene glycol mono-acylate (e.g. the monoacetate), ethylene glycol diacylate (e.g. the diacetate), terephthalic acid, mono-(beta-hydroxyethyl) terephthalate, bis-(beta-hydroxyethyl) terephthalate, and bis-(beta-hydroxyethyl) terephthalate-monoacylate.

For convenience, the organic feed material discussed above and consisting essentially of the bis-(beta-acyloxyethyl) terephthalate, the mono-(beta-acyloxyethyl) terephthalate, or the mono-bis mixture and which may also contain free terephthalic acid, will frequently hereinafter be referred to as the "ester feed."

The co-reactant is, as mentioned, ethylene glycol, hereinafter referred to simply as "glycol". The amount of glycol employed is at least sufficient to provide .06 mol per mol of the terephthalic acid moiety in the ester feed. Desirably, at least .15 mol of ethylene glycol is employed per mol of the terephthalic acid moiety in the ester feed, and preferably at least 0.20 mol of glycol is used per mol. The upper limit on the amount of glycol employed as co-reactant is one of economics since excess glycol is removed during final polymerization. Accordingly, normally less than 10 mols of glycol per mol of terephthalic acid moiety in the ester feed would be employed, desirably less than about 5 mols of ethylene glycol per mol, and preferably less than about 2 mols of ethylene glycol per mol of terephthalic acid moiety are used. An expecially preferred operation employs from about 0.1 to about 0.7 mols of ethylene glycol per mol, although as pointed out above, much broader ratios are quite operative.

Significant reaction conditions in the oligomerization reaction are temperature and time and these are directed to obtaining the desired extent of oligomerization. The production of a product with at least 50% of the original lower acylate moieties removed is necessary to achieve satisfactory high molecular weight fiber or film-forming polyester resins. Desirably, at least 75% of the acylate moieties are removed. There is, of course, no essential upper limit on the extent of oligomerization and it is quite practicable to operate in such fashion as to oligomerize to the extent that better than 90% of the acylate moieties in the ester feed are removed. The extent of the oligomerization is readily monitored by analysis of representative samples, e.g. by saponification to measure the quantity of acylate moieties removed.

Reaction temperatures of at least about 200° C. are necessary in order to obtain satisfactory rates of reaction but it is generally not desired to employ reaction temperatures above about 350° C. since at higher temperatures thermal degradation, with concomitant formation of color bodies, can become significant. The reaction is thus desirably conducted at temperatures between about 200° C. and about 300° C. and preferably at temperatures between about 230° C. and 280° C.

Pressure is not critical to the conduct of the reaction but it is generally desirable to maintain the pressure as low as is reasonably possible in order to facilitate removal of liberated by-products. In general, the pressure employed is atmospheric or subatmospheric, e.g. 1 mm. to 760 mm. Hg, preferably 5 to 100 mm. Hg, although the use of a superatmospheric pressure, e.g. 2 atmospheres or more, is not excluded.

Having set forth the extent of the reaction and the reaction temperatures, the reaction times cannot be independently specified; reaction time is dependent upon the factors already discussed. Generally, however, reaction times consistent with obtaining the above-mentioned extent of reaction and at the temperatures set forth would be between about 10 minutes and 10 hours and more commonly between about 45 minutes and 4 hours.

The reaction is suitably conducted catalytically. Suitable catalysts include compounds of metals, such as antimony, zinc, calcium, cerium, cadmium, lead, lithium, zirconium, aluminum, tin, titanium, and cobalt, such as the oxides, carbonates, sulfides, hydroxides, or carboxylates of these metals.

Catalyst concentrations are suitably between about 1 p.p.m. and about 10,000 p.p.m., desirably between about 100 p.p.m. and about 1,000 p.p.m. and preferably less than about 500 p.p.m. These weight percentages are based upon the ester feed to the reaction.

The reaction of this invention can be conducted without the use of extraneous solvents, and there is generally no need for any such solvent.

As mentioned, oligomerization of the ester feed is advantageously conducted in the liquid phase and may be carried out either batch-wise or continuously. Similarly, in either batch or continuous operation, either one or a plurality of stages can be employed. For example, the reaction can be conducted in a plurality of autoclave type reactors connected in series. The reaction can also be carried out in association with a fractional distillation unit in order to facilitate separation of by-products as the reaction proceeds.

As indicated, the by-products of the oligomerization reaction are carboxylic acid and the lower carboxylate esters of ethylene glycol corresponding to the carboxylate group of the mono- and bis-(beta-acyloxyethyl) terephthalates contained in the ester feed, together with some glycol, the relative proportions of by-products depending upon the composition of the ester feed. These by-products can be readily separated by fractional distillation since the carboxylic acid, e.g. acetic acid, glycol, and the lower carboxylate esters of glycol have substantially lower boiling points than the terephthalates fed to the reaction and the oligomers formed during the reaction and contained in the reaction product. Such separation can be effected in a separate distillation zone to which the oligomerized product is transferred and the by-product-free bottoms material then recycled to the oligomerization zone for further reaction. As previously mentioned, however, the separation is preferably effected in the oligomerization zone itself by carrying out the reaction in association with suitable distillation equipment under appropriate distillation conditions. It is thus possible by removal of by-products, to bring about the desired extent of oligomerization of the acyloxyethyl terephthalates contained in the ester feed, but it is a feature of the invention that even if only the minimum conversion is effected, the reaction product is nevertheless a suitable precursor for high-quality polyesters and such polyesters can be produced by direct polymerization or polycondensation of the product precursor after the addition thereto of appropriate quantities of glycol.

Before final polymerization, it is desirable, primarily from the standpoint of economic considerations to remove substantially all of the by-products formed in the oligomerization reaction. If, therefore, the oligomerization has been carried out with concurrent removal of by-products and if the operation has been such that substantial amounts of by-products still remain in the reaction mixture, then it is preferred that the reaction mixture be subjected to fractional distillation prior to the addition of ethylene glycol and the carrying out of polymerization. Similarly, if there has been separate by-product removal in a separate distillation zone, during the oligomerization reaction and if the final oligomerization product still contains significant quantities of by-product, then such further by-product removal can also be applied. This final removal of by-products of the oligomerization reaction can readily be accomplished by conventional fractional distillation techniques in conventional fractional distillation equipment. For example, the total oligomerization product could be subjected to distillation at pot temperatures of between 50 and 300° C., at pressures between 1 and 760 mm. Hg. Such purification, however, is optional and is not necessary if it is desired to remove these by-products at a later stage.

After the ethylene glycol has been added to the oligomerization reaction product and reacted with it, the polymerization or polycondensation to high molecular weight polyester resin is carried out in conventional manner normally employed for the polymerization of bis-(beta-hydroxyethyl) terephthalate. The reaction between the ethylene glycol and the oligomerization product is effected suitably by heating the mixture in the liquid phase for a short period of time, e.g. 1 to 100 minutes at an elevated temperature, e.g. oligomerization temperature under sufficient pressure to maintain the liquid phase. The catalyst for polymerization is suitably added with the glycol if it is not already in the system. The polymerization requires the presence of a catalyst and any conventional catalyst effective for the polymerization of bis-(beta-hydroxyethyl) terephthalate may be employed, including the catalysts named above which are suitable for the oligomerization reaction. In the polymerization or polycondensation such catalysts are conventionally employed in amounts sufficient to provide from $5 \times 10^{-6}$ to about $5 \times 10^{-2}$ mol of metal per mol of equivalent terephthalic acid contained in the feed to the polymerization. By "equivalent" terephthalic acid contained in the feed is meant not only any free terephthalic acid which may be present but its equivalent in whatever form it exists in the feed. The polymerization itself requires heating under vacuum, for example at a temperature between 220° C. and about 325° C., at a pressure from about 0.05 mm. Hg to about 20 mm. Hg, until ethylene glycol liberation ceases. This normally will require between about 20 minutes and about 6 hours. It should be noted that the material liberated during the polymerization contains not only ethylene glycol but also derivatives of the lower carboxylic acid corresponding to the acyl moiety of the feed, generally in the form of the carboxylate monoester of ethylene glycol, e.g. ethylene glycol monoacetate. From 0.1% to as much as 20% or even more of the ethylene glycol liberated during polymerization can be liberated in the form of such derivatives.

The final polymer produced is generally in the form of a white solid with a melting point above about 250° C. and with intrinsic viscosities greater than about 0.50 as determined in 60% phenol, 40% symmetrical tetrachloroethane (weight basis) solutions at 30° C.

The following examples will serve further to illustrate the invention but they are not intended as limiting the scope thereof. Unless otherwise stated, all parts and percents in the following examples are on a molar basis.

EXAMPLE I

An ester feed consisting essentially of 100 parts of a mixture of 70% bis-(beta-acetoxyethyl) terephthalate and 30% mono-(beta-acetoxyethyl) terephthalate is mixed with 350 p.p.m. of zinc acetate. The ester feed used in this example is prepared by thermal reaction between terephthalic acid and ethylene glycol diacetate. This mixture is charged to a glass reactor on top of which is disposed an Oldershaw distillation column having 20 glass trays. The reactor is provided with heating means and the mixture is heated to about 240° C. under a pressure of 760 mm. Hg for a period of 1 hour, then at 280° C. at 10 mm. Hg for 3 hours, during which there are removed continuously about 27 parts of acetic acid and 51 parts of ethylene glycol diacetate. The overhead product is analyzed and found to contain 76% of the charged acetate moieties. The bottoms product has added to it 30 parts ethylene glycol in which is dissolved 300 p.p.m. of antimony trioxide and the resulting mixture is then charged to a glass polymerizer, the temperature raised to 200° C. and kept at this temperature for 1 hour (to react the ethylene glycol). Then, the temperature is quickly raised to 280° C. at which point ethylene glycol, ethylene glycol diacetate and monoacetate vaporize out of the mixture. The temperature is kept at 280° C. for 30 minutes and the pressure on the polymerizer is then reduced over a 30 minute period to about 1 mm. Hg while still maintaining the temperature at 280° C. Heating under vacuum is continued for an additional 3 hours during which time additional ethylene glycol and ethylene glycol acetates are taken overhead. The product is found to be polyethylene terephthalate, white in color, having an intrinsic viscosity of 0.60, as determined in 60% phenol, 40% symmetrical tetrachlorethane (weight basis) solutions at 30° C.

EXAMPLE II

The procedure of Example I is repeated except that a greater proportion of ethylene glycol is added; i.e. 50 parts of ethylene glycol are used. The product of the above described mixture is found to be white and upon polymerization there is obtained a white polymer having an intrisic viscosity of 0.66 as determined by the method of Example I.

EXAMPLE III

The procedure of Example I is again repeated using magnesium acetate as the oligomerization catalyst and employing the same quantities of ethylene and ester feed except that 81% of the acetate moieties are removed and 20 parts of glycol are added. The polymer is of high quality and has an intrinsic viscosity of 0.65.

EXAMPLE IV

The procedure of Example III is repeated using a feed containing 27 parts of bis-(beta-acetoxyethyl) terephthalate, 66 parts of mono-(beta-acetoxyethyl) terephthalate, and 7 parts of terephthalic acid. 88% of the acetate moieties are removed and 20 parts of ethylene glycol are employed. A high quality product having an intrinsic viscosity of 0.74 is obtained.

EXAMPLE V

The procedure of Example I is repeated using, instead of the beta-acetoxyethyl-terephthalates, the corresponding beta-formoxyethyl terephthalates, beta-propionoxyethyl terephthalates, beta-butyroxyethyl terephthalates and beta-isobutyroxyethyl terephthalates. In each case, polymers similar to that of Example I are obtained.

EXAMPLE VI

Similar polymers are also obtained when the ester feed consists essentially of any of the above-named bis-(beta-acyloxyethyl) terephthalates or any of the above-named mono-(beta-acyloxyethyl) terephthalates, except that substantially larger amounts of glycol are used in the case of the bis esters.

The embodiments of the invention in which an exclusive property is claimed are defined as follows:

1. A process for the preparation of polyethylene terephthalate from an ester feed consisting essentially of bis-(beta-acyloxyethyl) terephthalate, mono-(beta-acyloxyethyl) terephthalate, or a mixture thereof, wherein the acyl group has 1 to 4 carbon atoms, said process comprising the steps of:
   (a) oligomerizing the ester feed by heating said feed at a temperature of about 200° C. to about 350° C. until at least about 50% of the acylate moieties in said ester feed have been liberated, thereby liberating carboxylic acid of 1 to 4 carbon atoms and the corresponding carboxylate ester of ethylene glycol as by-products,
   (b) removing said carboxylic acid and said carboxylate ester of ethylene glycol at least to the extent of 50% by weight of the amount of said acid and ester liberated,
   (c) adding ethylene glycol to said oligomerized reaction product in an amount which is at least 0.06 mol per mol of the terephthalic acid moiety in the ester feed, and reacting the same and
   (d) polymerizing the mixture of ethylene glycol and oligomerized reaction product to form a polyethylene terephthalate resin.

2. A process as defined in claim 1, wherein the ester feed consists essentially of bis-(beta-acetoxyethyl) terephthalate.

3. A process as defined in claim 1, wherein the feed mixture consists essentially of a mixture of bis-(beta-acetoxyethyl) terephthalate and mono-(beta-acetoxyethyl) terephthalate.

4. A process as defined in claim 1, wherein at least 0.15 mol of glycol is employed in the mixture per mol of terephthalic acid moiety in the oligomerized reaction product.

5. A process as defined in claim 1, wherein the by-products formed during the oligomerization of said ester feed are removed at least in part during the oligomerization reaction.

6. A process for the preparation of polyethylene terephthalate from an ester feed consisting essentially of bis-(beta-acyloxyethyl) terephthalate, mono-(beta-acyloxyethyl) terephthalate, or a mixture thereof, wherein the acyl group has 1 to 4 carbon atoms, said process comprising the steps of:
   (a) reacting the ester feed in the presence of a catalyst at a temperature between about 200° C. and 350° C. until at least about 50% of the acylate moieties in sadi ester feed have been liberated, thereby liberating carboxylic acid of 1 to 4 carbon atoms and the corresponding carboxylate ester of ethylene glycol as by-products,
   (b) removing said carboxylic acid and said carboxylate ester of ethylene glycol at least to the extent of 50% by weight of the amount of said acid and ester liberated, (c) adding ethylene glycol to said oligomerized reaction product in an amount which is at least 0.06 mol per mol of the terephthalic acid moiety in the ester feed, and reacting the same and (d) polymerizing the mixture of ethylene glycol and oligomerized reaction product to form a polyethylene terephthalate resin.

7. A process as defined in claim 6, wherin the ester feed consists essentially of mono-(beta-acetoxyethyl) terephthalate.

8. A process as defined in claim 6, wherein the feed mixture consists essentially of a mixture of bis-(beta-acetoxyethyl) terephthalate and mono-beta-acetoxyethyl) terephthalate.

9. A process as defined in claim 6, wherein at least 0.15 mol of glycol is employed in the mixture per mol of terephthalic acid moiety in the oligomerized reaction product.

10. A process as defined in claim 6, wherein the by-products formed during the oligomerization of said ester feed are removed at least in part during the oligomerization reaction.

References Cited
FOREIGN PATENTS
760,125   11/1956   Great Britain.
1,960,006   8/1970   Germany.

MELVIN GOLDSTEIN, Primary Examiner

U.S. Cl. X.R.
260—75 R, 475 P